United States Patent [19]

Jones, Jr. et al.

[11] Patent Number: 5,227,989
[45] Date of Patent: Jul. 13, 1993

[54] ARITHMETIC LOGIC UNIT FOR MICROPROCESSOR WITH SIGN BIT EXTEND

[75] Inventors: Morris E. Jones, Jr., Saratoga; James A. Picard, San Jose, both of Calif.

[73] Assignee: Chips and Technologies, Inc., San Jose, Calif.

[21] Appl. No.: 770,043

[22] Filed: Sep. 30, 1991

Related U.S. Application Data

[63] Continuation-in-part of Ser. No. 767,239, Sep. 27, 1991.

[51] Int. Cl.⁵ .............................. G06F 7/48; G06F 7/50
[52] U.S. Cl. ...................................... 364/716; 364/787
[58] Field of Search ...................... 364/716, 736.5, 768, 364/784, 787, 760

[56] References Cited

U.S. PATENT DOCUMENTS 4,263,660  4/1981  Prioste .................................. 364/716
4,785,393  11/1988  Chu et al. ............................ 364/716
4,888,722  12/1989  Boreland ............................ 364/736.5
5,038,315  8/1991  Rao ...................................... 364/760

Primary Examiner—David H. Malzahn
Attorney, Agent, or Firm—Elmer Galbi; Joseph A. Sawyer, Jr.

[57] ABSTRACT

An arithmetic logic unit for a microprocessor is shown and described for use in a 24-bit data path where the ALU includes three separate ALU portions, one for each byte of the data path, and three separate control signals, one for each portion of the ALU. The ALU provides a variety of arithmetic and logic functions for application to 24-bit operands, but also includes a capability of manipulating such operands in accordance with sign extended opcodes without actually physically executing a sign extend operation within the microprocessor. In this manner, the ALU executes the necessary logic functions to provide the same ultimate result as sign bit extension, but does not require a separate sign bit extension step within the microprocessor to convert signed byte operand into a signed word operand.

9 Claims, 4 Drawing Sheets

ARITHMETIC LOGIC UNIT FOR MICROPROCESSOR WITH SIGN BIT EXTEND

RELATED APPLICATION

The present application is a continuation-in-part of co-pending U.S. patent application Ser. No. 07/767,239, entitled MICROPROCESSOR WITH CUSTOMIZATION MODE, filed Sep. 27, 1991 by Blomgren, et al, and assigned to the assignee of the present application.

BACKGROUND OF THE INVENTION

The present invention relates generally to microprocessors, and more particularly to an arithmetic logic unit of a microprocessor.

As used herein the term "byte" shall refer to an 8-bit digital word where the least significant bit is "bit 0" and the most significant bit is "bit 7" with intervening bits named accordingly. The term "word" shall refer to two bytes, a series of sixteen bits from "bit 0" to "bit 15" with intervening bits named accordingly. When applying logical operations to digital values the symbol "*" shall represent an AND function, the symbol "+" shall represent an OR function, and the prefix "!" shall represent inversion.

Some instruction opcodes in microprocessor instruction sets contain a sign extension bit for converting a signed byte operand into a signed word operand. For example, the iAPX 86 family of microprocessors includes opcodes with sign extend bits. In the prior art, this has been accomplished by physically replicating the sign bit of the byte operand into the second byte of the word operand. Thus, bit 7 of the byte operand becomes bits 8 through 15 of the word operand and the word operand is then applied in some fashion to an arithmetic or logical function. Such physical replication of the sign bit into the upper or second byte of the word operand requires a separate machine cycle in response to an opcode having the sign extend bit set.

U.S. Pat. No. 4,363,091 entitled EXTENDED ADDRESS, SINGLE AND MULTIPLE BIT MICROPROCESSOR, filed Jan. 31, 1978 by Pohlman, III et al., and issued Dec. 7, 1982, shows an implementation of sign bit extension within a microprocessor.

It is desirable to provide the same ultimate result as achieved by sign bit extension in response to opcodes presented to a microprocessor, without requiring a separate machine cycle to accomplish sign bit extension. The subject matter of the present invention provides a mechanism for achieving this result in a microprocessor.

SUMMARY OF THE INVENTION

In accordance with a preferred embodiment, the present invention is implemented within a microprocessor having a 24-bit internal data path coupled to a 24-bit arithmetic logic unit including three 8-bit arithmetic logic units operating together. Each 8-bit arithmetic logic unit has a corresponding, separate set of operation control signals.

By virtue of logic employed against each bit of the ALU and selected application of control signals, a general purpose ALU is provided which implements sign extension in a microprocessor without producing a sign extended operand.

The subject matter of the present invention is particularly pointed out and distinctly claimed in the concluding portion of this specification. However, both the organization and method of operation of the invention, together with further advantages and objects thereof, may best be understood by reference to the following description taken with the accompanying drawings wherein like reference characters refer to like elements.

BRIEF DESCRIPTION OF THE DRAWINGS

For a better understanding of the invention, and to show how the same may be carried into effect, reference will now be made, by way of example, to the accompanying drawings in which.

DETAILED DESCRIPTION OF THE PREFERRED EMBODIMENT

Figure 1:
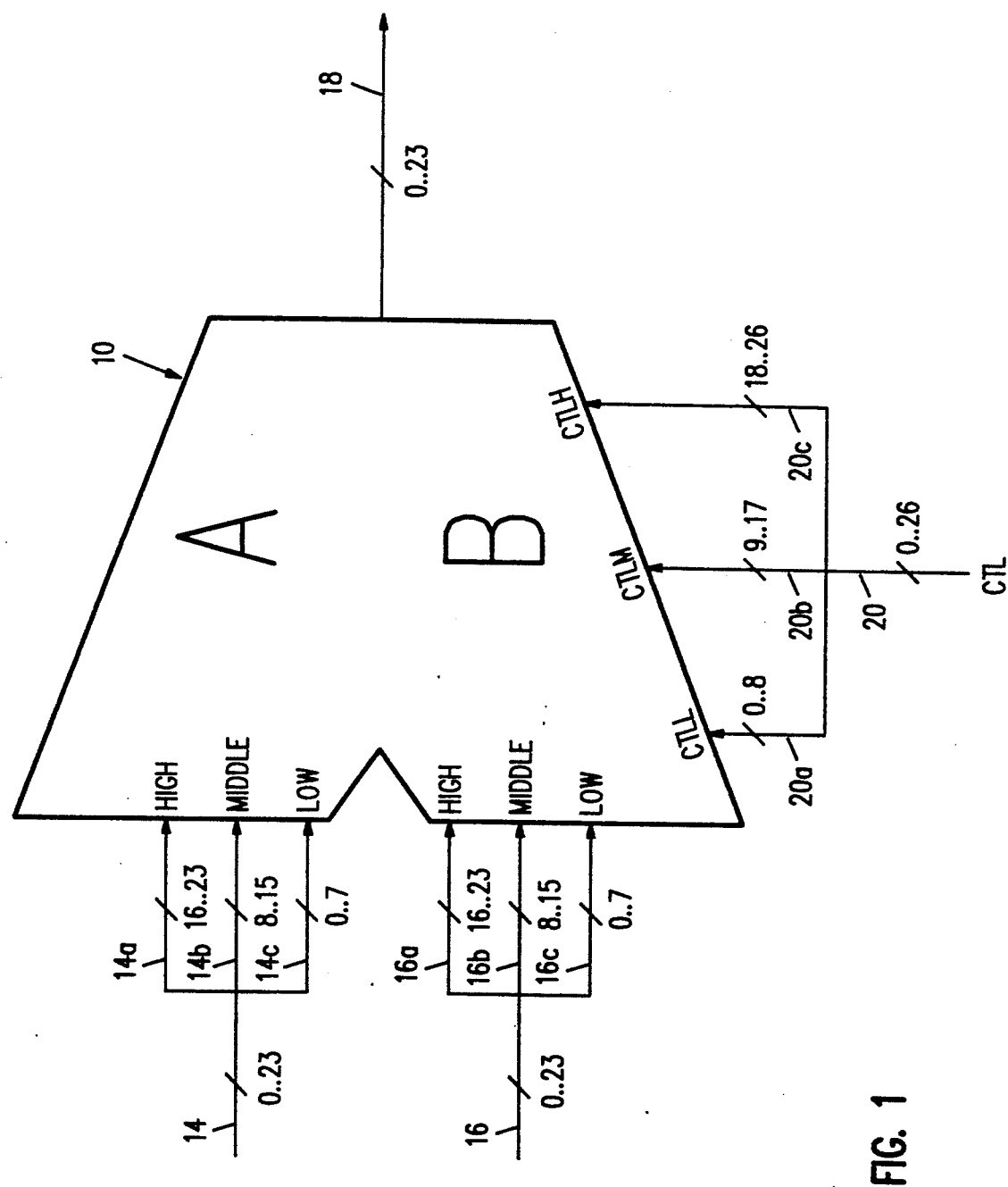
FIG. 1 is an arithmetic logic unit (ALU) in accordance with the present invention.

FIG. 1 illustrates an arithmetic logic unit (ALU) 10 according to the present invention. An arithmetic logic unit is a logic device positioned within a data path and used to apply arithmetic and logic functions to operands of the data path presented as inputs. The ALU 10 operates in a 24-bit data path, receiving 24-bit A operand 14 and 24-bit B operand 16 to produce 24-bit result 18 in accordance with a 27-bit control signal (CTL) 20.

It may be appreciated that the provision of the 27-bit control signal CTL 20 is derived from microcode instructions of a microprocessor invoked in response to presentation of opcodes for execution. More particularly, the opcode values of the microprocessor instruction set may include a sign extend bit and the microprocessor decoding circuitry would suitably invoke associated microcode instruction sequences for each opcode presented for execution. Thus, it will be understood that production of the 27-bit control signal CTL 20 results from invocation of microcode instruction in response to opcodes presented.

In the data path, the bits 0 through 7 shall be referred to as the "low byte", the bits 8 through 15 as the "middle byte", and the bits 16 through 23 as the "high byte". Thus, A operand 14 includes low byte 14a, middle byte 14b, and high byte 14c. Similarly, B operand 16 includes three bytes 16a through 16c. In the control signal CTL 20, the bits 0 through 8 shall be referred to as CTLL 20a, the bits 9 through 17 as CTLM 20b, and the bits 18 through 26 as CTLH 20c.

A separate portion of CTL 20 applies to each of the low, middle and high bytes of the A and B operands. CTLL 20a applies to low bytes 14a and 16a of A operand 14 and B operand 16, respectively. In like fashion, CTLM 20b applies to the middle bytes 14b and 16b, and CTLH 20c applies to high bytes 14c and 16c.

Result 18 is the consequence of a selected arithmetic or logical function, corresponding to a given state of CTL 20, applied to A and B operands 14 and 16.

Figure 2:
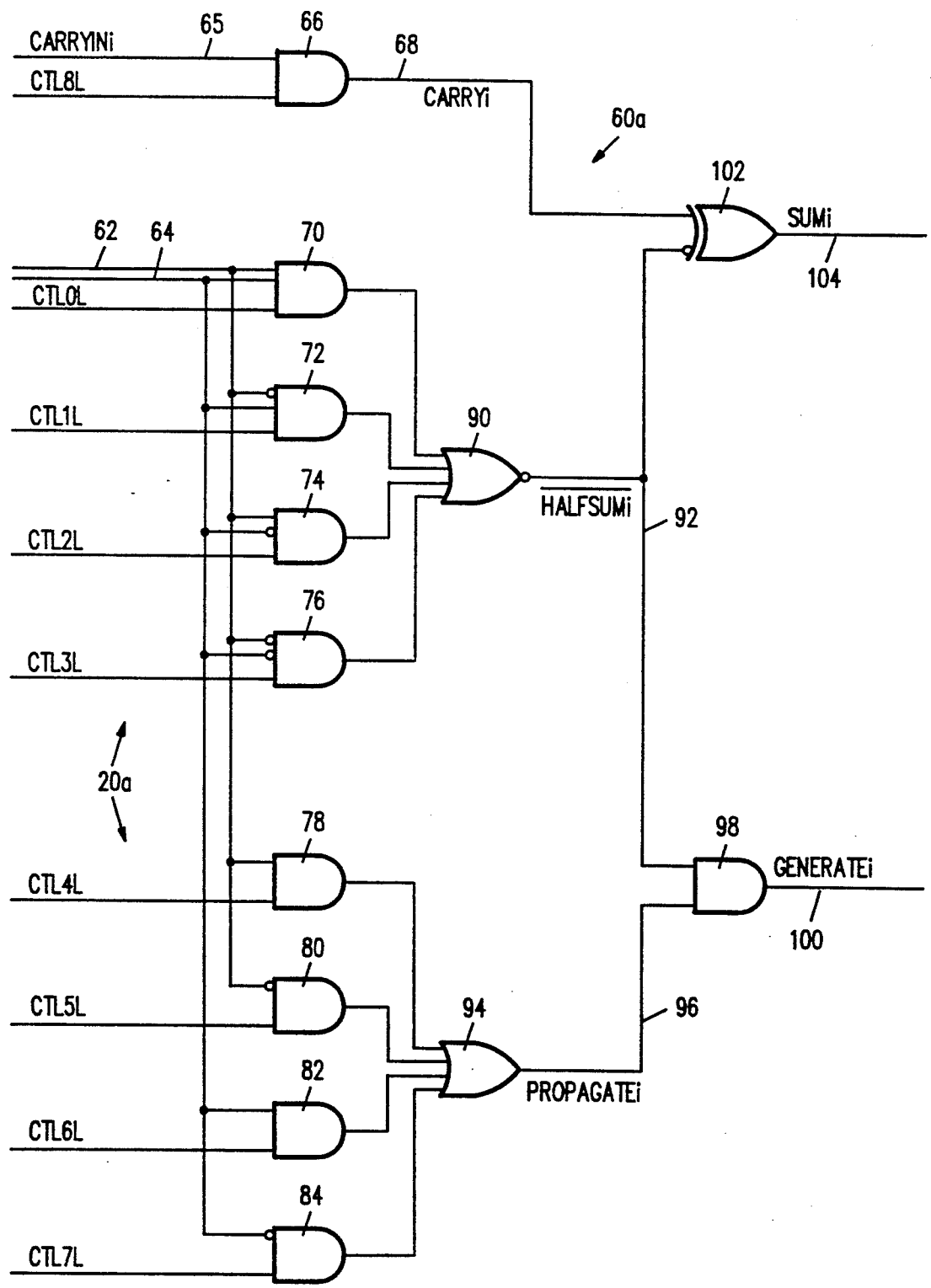
FIGS. 2-4 illustrates the use of separate control signals for each portion of the ALU of FIG. 1 and the logic applied to each bit of the ALU of FIG. 1.
Figure 3:
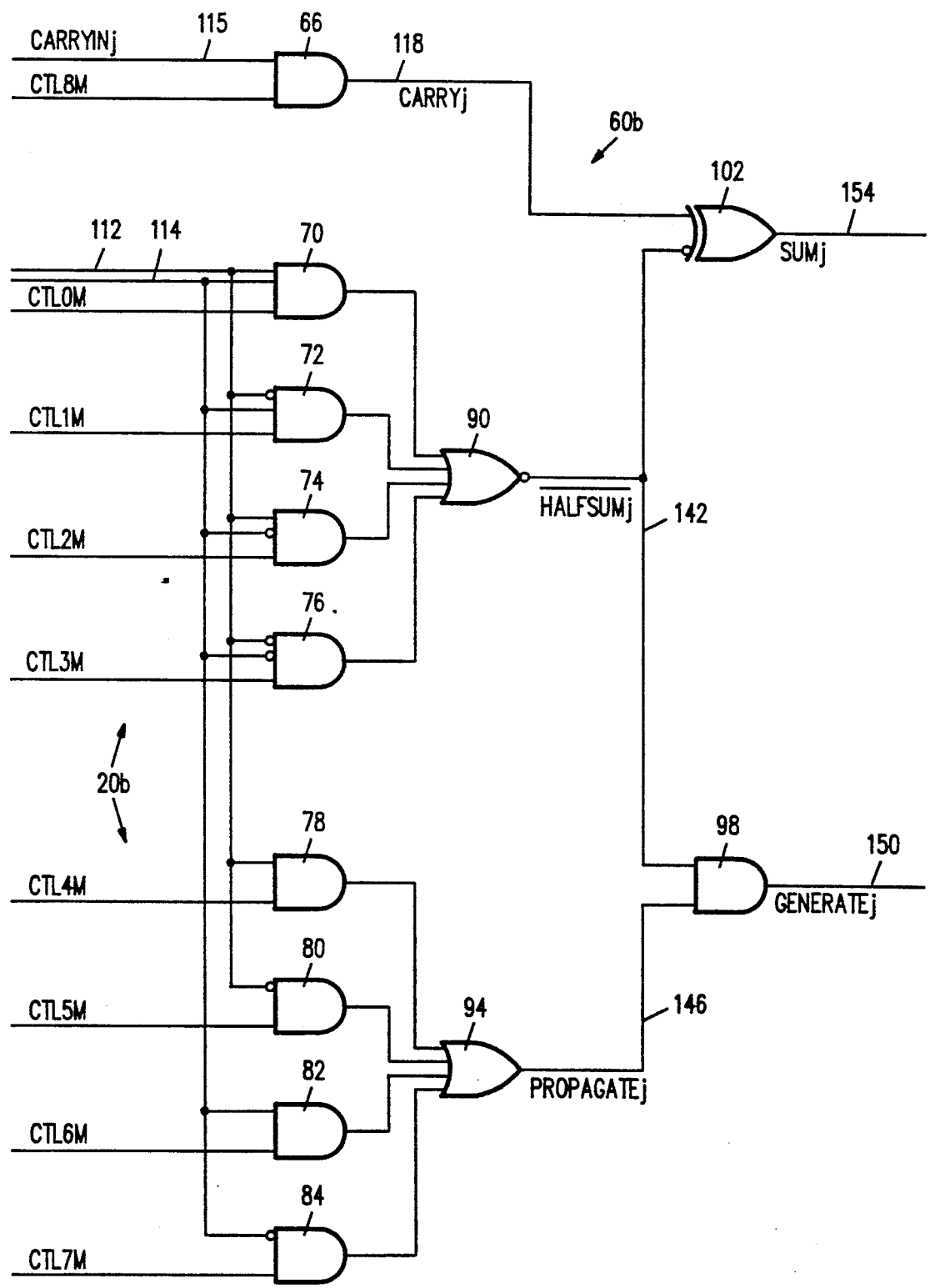
Figure 4:
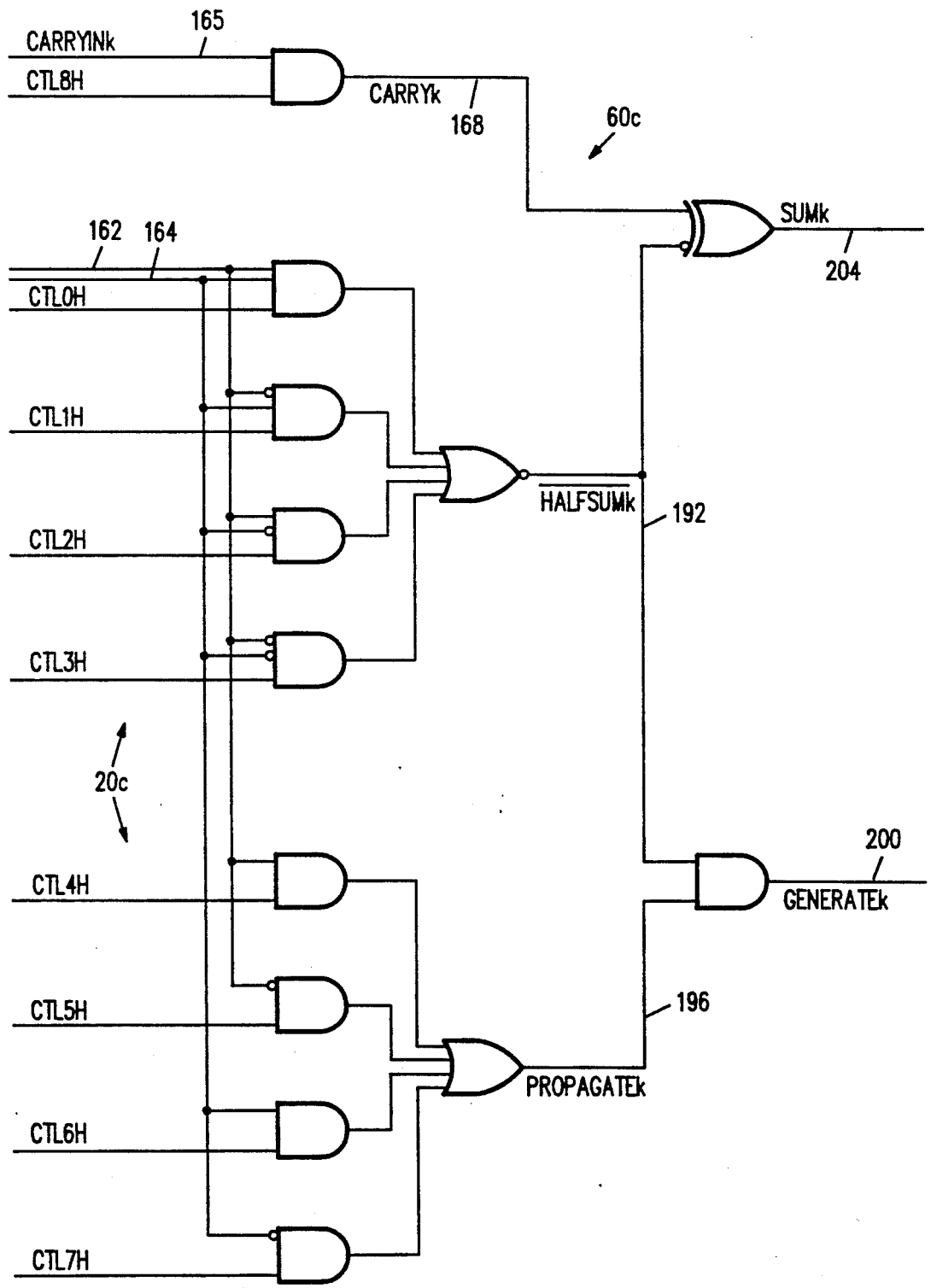

FIGS. 2-4 illustrate logic 60 applied to each bit in ALU 10. In each of FIGS. 2-4 logic 60 is identical, but with different data and control applied. It will be noted, therefore, that the input data, control signals and result data differ in name in FIGS. 2-4 and that the logic 60 including reference numerals applied thereto is identical in FIGS. 2-4. In FIG. 2, logic 60a applies to each bit of low bytes 14a and 16a of A operand 14 and B operand 16, respectively; in FIG. 3, logic 60b applies to each bit of middle bytes 14b and 16b; and in FIG. 4, logic 60c applies each bit of high bytes 14c and 16c.

As used herein, the subscript "i" shall represent or be associated with corresponding bits of low bytes 14a and 16a, the subscript "j" with corresponding bits of middle bytes 14b and 16b, and the subscript "k" with corresponding bits of high bytes 14c and 16c.

With reference to FIG. 2, the bits Ai 62 and Bi 64 represent corresponding bits of low bytes 14a and 16a, respectively. CTLL 20a appears as the bit values CTL0L through CTL8L. CTL8L and CARRYINi bit 65 are combined as inputs at two-input AND gate 66 to produce the term CARRYi 68. CTL0L through CTL3L each apply as an input to one of the three-input AND gates 70, 72, 74, and 76, respectively. The second and third input for each of AND gates 70, 72, 74, and 76 are the bits Ai 62 and Bi 64, respectively. Ai 62 is inverted, however, at the input to AND gates 72 and 76. Bi 64 is inverted at the inputs to gates 74 and 76. CTL4L through CTL7L each apply as an input to one of the two-input AND gates 78, 80, 82, and 84. The second input to AND gate 78 is Ai 62 and the second input to AND gate 80 is !Ai 62. The second input to AND gate 82 is Bi 64 and the second input to AND gate 84 is !Bi 64. The outputs from AND gates 70, 72, 74 and 76 are applied to NOR gate 90 to produce the term !HALFSUMi 92. The outputs from AND gates 78, 80, 82 and 84 are applied to OR gate 94 to produce the term PROPAGATEi 96. AND gate 98 combines the terms !HALFSUMi 92 and PROPAGATEi 96 to produce the term GENERATEi 100 while XOR gate 102 combines !HALFSUMi 92 and CARRYi 68 to produce the term SUMi 104.

A separate logic 60a is provided for each of the corresponding bits 0 through 7 of low bytes 14a and 16a, i.e. for i values 0 through 7, but with the same control CTLL 20a applied to each.

In FIG. 3, logic 60b receives corresponding bits Aj 112 and Bj 114 of middle bytes 14b and 16b, CARRYINj bit 115, and CTLM 20b to produce the terms CARRYj 118, !HALFSUMj 142, PROPAGATEj 146, GENERATEj 150, AND SUMj 154. Thus, a separate logic 60b applies for j values 8 through 15, but with the same control CTLM 20b applied to each.

In FIG. 4, logic 60c receives corresponding bits Ak 162 and Bk 164 of high bytes 14c and 16c, CARRYINk bit 165, and CTLH 20c to produce the terms CARRYk 168, !HALFSUMk 192, PROPAGATEk 196, GENERATEk 200, AND SUMk 204. Thus, a separate logic 60c applies for k values 15 through 23 but with the same control signal CTLH 20c applied to each.

Logic 60 is then replicated once for each of the bits 0 through 23 of result 18 with each instance of logic 60 receiving the corresponding bits of the A and B operands 14 and 16, respectively, and producing the corresponding bits of result 18. Further, those instances of logic 60a applied to the low bytes 14a and 16a of the A and B operands receive the corresponding portion 20a of control signal CTL 20, those instances of logic 60b applied to middle bytes 14b and 16b of the A and B operands receive the corresponding portion 20b of CTL 20, and those instances of logic 60c applied to high bytes 14c and 16c receive the corresponding portion 20c of CTL20.

The terms GENERATEi 100, GENERATEj 150, GENERATEk 200, PROPAGATEi 96, PROPAGATEj 146, and PROPAGATEk 196 are used as in a conventional adder to generate the terms CARRYINi 68, CARRYINj 118, and, CARRYINk 168.

Thus, it may be appreciated how the ALU 10 receives the A operand 14, the B operand 16, and a control signal CTL 20 to produce the result 18.

The ALU 10 is capable of providing a variety of arithmetic and logic functions to the A operand 14 and B operand 16 corresponding to selected values for control signal CTL 20. Of specific interest herein, however, are the artithmetic and logic functions associated with sign bit extension. To illustrate, the add function will be discussed in its normal mode, sign bit extended with the value 0, and sign bit extended with the value 1.

A normal 16- bit add function, i.e. A operand 14 plus B operand 16, is accomplished with the following value for CTL 20:

| | CTLH | CTLM | CTLL | |
|---|---|---|---|---|
| BIT | 8 7654 3210 | 8 7654 3210 | 8 7654 3210 | CARRYIN |
| | 0 0000 0000 | 1 0101 0110 | 1 0101 0110 | 0 | where
CTLL=CTLM
HALFSUM=!A * B+A * !B
PROPAGATEi=PROPAGATEj=A+B
to produce the desired 16-bit propagate value and 16-bit sum.

A normal 16-bit sign extended add with the B data being sign extended with zeros is accomplished with the following value for CTL 20:

| | CTLH | CTLM | CTLL | |
|---|---|---|---|---|
| BIT | 8 7654 3210 | 8 7654 3210 | 8 7654 3210 | CARRYIN |
| | 0 0000 0000 | 1 0001 0101 | 1 0101 0110 | 0 | where
HALFSUMi=!iAi * Bi+Ai * !Bi
HALFSUMj=Aj * Bj+Aj * !Bj=Aj
PROPAGATEi=Ai+Bi
PROPAGATEj=Aj A normal 16-bit sign extended add with the B data being sign extended with ones is accomplished with the following value for CTL20:

| | CTLH | CTLM | CTLL | |
|---|---|---|---|---|
| BIT | 8 7654 3210 | 8 7654 3210 | 8 7654 3210 | CARRYIN |
| | 0 0000 0000 | 1 1101 1010 | 1 0101 0110 | 0 | where
HALFSUMi=!Ai * Bi+Ai * !Bi
HALFSUMj=!Aj * Bj+!Aj * !Bj=!Aj
PROPAGATEi=Ai+Bi
PROPAGATEj=Aj+!Aj=Bj+!Bj=1

In each case the actual sign extended value of B operand 16 is never created and does not exist within the B operand data path and need not feed into the propagate logic of ALU 10. The GENERATE signal is normally A * B, but because of the partial terms available in previous operations, GENERATE is computed as:

yielding
HALFSUM = A * !B + !A * B
!HALFSUM = !A * !B + A * B
GENERATE = PROPAGATE * !HALFSUM
= (A + B) * (!A * !B + A * B)
= A * A * B + A * B * B -continued

= A * B as desired.

Other than those operational aspects of ALU 10 discussed above, ALU 10 operates in convention fashion.

In addition to the above-illustrated examples of the ADD function in normal, extended with 0, and extended with 1 modes, the following additional ALU 10 functions and associated control signal CTL 20 values further illustrate operation of ALU 10:

|  | CTLH | CTLM | CTLL |  |
|---|---|---|---|---|
|  | 8 7654 3210 | 8 7654 3210 | 8 7654 3210 | CIN |
| BIT |  |  |  |  |
| 16 bit SUB | 0 0000 0000 | 1 1001 1001 | 1 1001 1001 | 1 |
| SUB extend 0 | 0 0000 0000 | 1 1101 1010 | 1 1001 1001 | 1 |
| SUB extend 1 | 0 0000 0000 | 1 0001 0101 | 1 1001 1001 | 1 |
| 16 bit XOR | 0 0000 0000 | 0 0000 0110 | 0 0000 0110 | 0 |
| XOR extend 0 | 0 0000 0000 | 0 0000 0101 | 0 0000 0110 | 0 |
| XOR extend 1 | 0 0000 0000 | 0 0000 1010 | 0 0000 0110 | 0 |
| 16 bit AND | 0 0000 0000 | 0 0000 0001 | 0 0000 0001 | 0 |
| AND extend 0 | 0 0000 0000 | 0 0000 0000 | 0 0000 0001 | 0 |
| AND extend 1 | 0 0000 0000 | 0 0000 0101 | 0 0000 0001 | 0 |
| 16 bit OR | 0 0000 0000 | 0 0000 0111 | 0 0000 0111 | 0 |
| OR extend 0 | 0 0000 0000 | 0 0000 0101 | 0 0000 0111 | 0 |
| OR extend 1 | 0 0000 0000 | 0 0000 1111 | 0 0000 0111 | 0 |

As may be appreciated by those skilled in the art, a great number of logic and arithmetic functions are provided by various other combinations of values for the control signal CTL 20, with those illustrated herein being only by way of example. Thus, the illustrated ALU 10 functions shown herein are not a complete list, rather only a sampling of the wide variety of ALU functions provided by ALU 10.

Thus, an ALU for a microprocessor has been shown and described wherein the same ultimate result as achieved by sign bit extension is accomplished within the ALU and without the separate step of executing a replication of a sign bit in a byte operand into the upper byte of a word operand. It may be appreciated that the provision of the same ultimate result as achieved by sign bit extension capabilities inherently within the ALU avoids the preliminary step of converting a single signed byte operand into a signed word operand. In other respects, the ALU is capable of providing the necessary arithmetic and logic functions typically found in a microprocessor system. By suitably branching to selected microcode in response to presented opcodes of the microprocessor instruction set, the necessary control signals are presented to the ALU in order to accomplish the selected arithmetic and logic functions indicated by the opcode presented for instruction.

It will be appreciated that the present invention is not restricted to the particular embodiment that has been described and illustrated, and that variations may be made therein without departing from the scope of the invention as found in the appended claims and equivalence thereof. For example, while 16-bit functions have been illustrated with the control signal CTLH 20c set to all zeros, 24-bit arithmetic and logic functions may be performed using suitable values for CTLH 20c.

What is claimed is:

1. An arithmetic Logic unit (ALU) for operating upon operands A and B and a control signal to produce a result, each of said operands having a low operand byte, a middle operand byte, and a high operand byte, said control signal having a low control byte, a middle control byte and a high control byte, said ALU comprising:

a first ALU means receiving and for logically operating upon said low operand bytes and said low control byte to produce low result byte;

a second ALU means for receiving and for logically operating upon said middle operand bytes and said middle control byte to produce middle result byte; and a third ALU means for receiving and for logically operating upon said high operand bytes and said high control byte to produce high result byte;

said first, second and third ALU means including logic means to generate intermediate logical signals which can be combined to equal the result of converting a signed byte operand into a signed word operand.

2. An ALU according to claim 1 wherein said logic means includes means for generating HALFSUM terms (!A * B+A * !B).

3. An ALU according to claim 1 wherein said logic means includes means for generating first HALFSUM terms (!A * B+A * !B), and second HALFSUM terms (A * B+A * !B)=A.

4. An ALU according to claim 1 wherein said low operand byte of said control signal has a first state and a second state and said logic means has means for producing HALFSUM terms (!A * B+A * !B) when said control signal is in said first state and HALFSUM terms (!A * B+!A * !B)=(!A) when said control signal is in said second state.

5. An ALU according to claim 1 wherein said logic means produces a GENERATE term as (PROPAGATE * !HALFSUM) where !HALFSUM is produced as (!A * !B+A * B) and for a state of said control signal corresponding to a normal ADD function said PROPAGATE term is computed as A+B.

6. An ALU according to claim 1 wherein said logic means produces a GENERATE term as (PROPAGATE * !HALFSUM) where !HALFSUM is produced as (!A * !B +A * B) and for a state of said control signal corresponding to an ADD function sign extended with zeros a first portion PROPAGATE term is computed as (A+B) and a second portion PROPAGATE term is computed as (A).

7. An ALU according to claim 1 wherein said logic means produces a GENERATE term as (PROPAGATE * !HALFSUM) where !HALFSUM is produced as (!A * !B+A * B) and for a state of said control signal corresponding to an ADD function sign extended with ones a first portion PROPAGATE term is computed as (A+B) and a second portion PROPAGATE term is computed as logic 1.

8. An ALU according to claim 1 wherein said logic means comprises bit logic wherein each bit logic receives corresponding bits of an A operand and a B operand taken from said data path and applies the corresponding portions of the control signal to provide the corresponding bit of the result.

9. An ALU for performing arithmetic and logic functions having an A operand input, a B operand input, a control signal input, and a result output, the result output being a function of the values of the A operand, the B operand and control signal inputs, each of said A operand, B operand, control signal and result having a low order byte, a middle order byte and a high order byte, said ALU comprising:

first ALU means receiving said low order byte of each of said A operand, said B operand, and said control signals, and producing said low order byte of said result;

second ALU means receiving said middle order byte of each of said A operand, said B operand, and said control signals, and producing said middle order byte of said result; and third ALU means receiving said high order byte of each of said A operand, said B operand, and said control signals, and producing said high order byte of said result, whereby said low order, middle order and high order bytes of said control signal may be applied to said ALU to produce a corresponding arithmetic and logic function of said A operand and said B operand as said result.

* * * * *